Figures 1, 2:
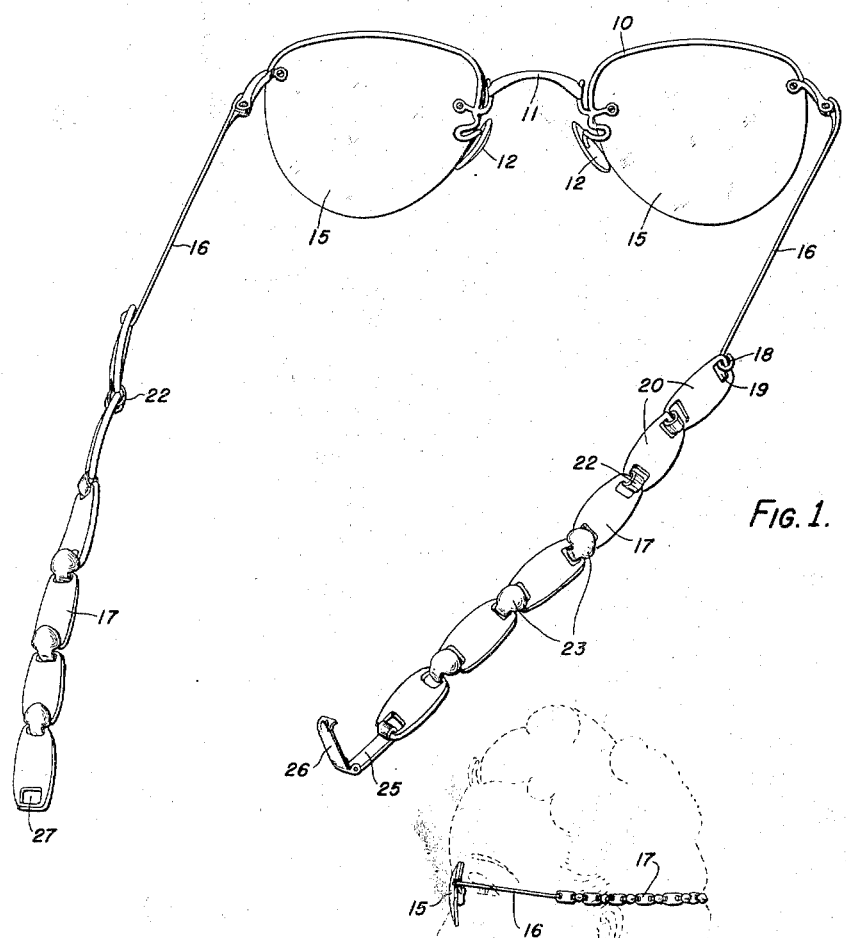

Jan. 17, 1950     B. FORNICOIA     2,494,750
SPECTACLES WITH ORNAMENTAL CHAIN
FOR HOLDING THEM IN PLACE
Filed Nov. 12, 1947

INVENTOR.
BEATRICE FORNICOIA
BY
ATTORNEY

Patented Jan. 17, 1950

2,494,750

UNITED STATES PATENT OFFICE 2,494,750

SPECTACLES WITH ORNAMENTAL CHAIN FOR HOLDING THEM IN PLACE

Beatrice Fornicoia, Rochester, N. Y.

Application November 12, 1947, Serial No. 785,392

2 Claims. (Cl. 88—51)

The present invention relates to spectacles and particularly to means for holding spectacles in place. In a more specific aspect the invention relates to spectacles and spectacle holding means particularly adapted for feminine use.

The pressure of the nose-clips on the sides of the nose and the rubbing action and pressure of the bows behind the ears with the conventional type of spectacle are a source of irritation and discomfort to people who are required to wear glasses constantly. In some cases the wearers develop sores along the sides of the nose and behind the ears from the pressure of their spectacles. Many persons wrap their bows in tape to provide greater bearing area and avoid this pressure. This is uncomfortable, however, and tends to throw the lenses out of correct position.

One object of the present invention is to provide means for holding a spectacle in position which will eliminate pressure of the spectacle on the nose and behind the ears and obviate completely all possibility of irritation, soreness, or discomfort at these points.

Another object of the invention is to provide a new and improved type of spectacle holder which will be highly ornamental and enhance the appearance of the wearer.

A further object of the invention is to provide a spectacle holder, particularly for feminine use, which will not only hold the glasses firmly and correctly in position but which will also serve to retain in place the wearer's hair.

Still another object of the invention is to provide means for holding a spectacle in place which will also serve as an artistic article of feminine attire, and one that can be changed at will to suit the dress of the user.

Other objects of the invention will be apparent hereinafter from the specification and from the recital of the appended claims.

In the drawings:

Fig. 1 is a perspective view of a spectacle provided with holding means made according to one embodiment of the invention; and Fig. 2 is a side elvation showing the improved spectacle in use.

In the embodiment of the invention shown in the drawings, 10 denotes the spectacle frame which is provided with a bridge 11 and with nose-clips 12. These parts may be of conventional construction, except that the nose-clips simply serve as rests and do not need to pinch the nose. They may, if desired, be eliminated entirely. The lenses 15 may be secured to the frame 10 in conventional manner.

Hingedly connected in conventional or any suitable manner to the frame 10 are the temple pieces 16. These differ from the temple pieces heretofore used in that they have no ear engaging portions and they are of a length to terminate in front of the ear of the user as shown in the diagrammatic view of Fig. 2.

Pivotally connected to each temple piece 16 is an ornamental linked chain 17. In the embodiment shown, each temple piece 16 has a loop 18 formed at its rear end which engages in a slot 19 of the front link 20 of a chain 17.

The chains 17 shown are similar to those used in ladies' bracelets. Each is made of a plurality of links connected by loops 22. Both links and loops may be made of gold or other precious metal and certain of the connecting loops, such as those designated 23, may be enlarged and rounded to increase the ornamentality of the chain.

The two chains 17 are adapted to be connected together at the back of the user's head in order to hold the spectacles in place. For this purpose, a snap-clip 25, such as is used in clipping chain bracelets together, may be attached to the last link of one of the chains 17. The bight portion 26 of this clip may be passed through the slot 27 in the last link of the other chain 17 and snapped shut to hold the spectacles in place.

The user then simply puts the glasses on her nose, takes the two chains in her two hands and fastens their ends together at the back of her head. The inside links 20 of the chains pivot sufficiently on the loops 18 to permit the chain to be adjusted on the head to hold the spectacles securely in place. I have found in actual use that the chains hold spectacles in place more securely than nose-clips and ear-pieces have ever done, and the discomfort and irritation of these holding means are entirely eliminated. To remove the spectacles, all that is required is to unsnap clip 25.

For gold rimmed dress spectacles, I ordinarily prefer to retain the nose-clips, but adjust them so that they do not pinch the nose. They then serve simply as rests to support the lenses in position. For sports glasses, such as sun glasses, and for lighter frames, especially, the nose-clips are eliminated entirely. Whereas there is a tendency with the ordinary spectacle, which has no nose clips, for the bridge to slip down on the nose, throwing the lenses out of position, with my structure the spectacles are firmly held in position and the glasses do not slip at all.

The type of chain shown in the drawings is simply an example of what may be employed. Such a chain is preferably made of gold. It is obvious, however, that the chains may be made of any other suitable material including, for instance, colored plastics as well as metal. The links can be made of various shapes and they may be plain or ornamented with precious or semi-precious stones if desired.

Aside from holding spectacles in place, the chains serve the additional function of holding the coiffure together and prevent hairs from becoming misplaced. They constitute an attractive headdress ornament; so much so, that milady may want to change chains when changing from one type of dress to another, as for instance, from daytime to evening attire. Various type chains can be provided to go with a single pair of spectacles to fit the dress of the wearer. To permit easy change of chains, the loops 18 at the ends of the temple pieces may be left slightly open; or, the chains 17 may be connected releasably to the temple pieces by snap clips similar to snap-clip 25.

Instead of two sections of chain, a single piece can be used which is attached at one end to one temple piece 16 and at its opposite end to the other temple piece 16. Ordinarily, however, I prefer to use two chain sections, as shown, which are adapted to be connected together at the nape of the head. This provides a symmetrical construction.

In general, it may be said that while a particular embodiment of the invention has been shown, this application is intended to cover any variations, uses, or adaptations of the invention following, in general, the principles of the invention and including such departures from the present disclosures as come within known or customary practice in the art to which the invention relates and as may be applied to the essential features hereinbefore set forth and as fall within the scope of the invention or the limits of the appended claims.

Having thus described my invention, what I claim is:

1. In spectacles, the combination with a frame for the lenses, of a pair of relatively straight, rigid temple pieces pivoted at their front ends to opposite sides, respectively, of the frame, an ornamental link chain pivotally connected to the rear ends of the temple pieces, the links of the chain having substantially flat inside surfaces and together forming a smooth inner surface to fit the contour of the head of the wearer, and means for securing the chain behind the nape of the wearer's head to hold the spectacles in place.

2. In spectacles, the combination with a frame for the lenses, of a pair of relatively straight, rigid temple pieces pivoted at their front ends to opposite sides, respectively, of the frame, said temple pieces being of a length to terminate in front of the ears of a wearer, and a pair of ornamental link chain sections pivotally connected to the rear ends of the two temple pieces, the links of said chain sections having substantially flat inside surfaces and said chain sections together forming a smooth inner surface to fit the contour of the head of the wearer, and means for securing said chain sections together behind the nape of the wearer's head.

BEATRICE FORNICOIA.

REFERENCES CITED

The following references are of record in the file of this patent:

UNITED STATES PATENTS

| Number | Name | Date |
|---|---|---|
| 1,207,849 | Brennecke | Dec. 12, 1916 |
| 1,370,806 | Garner | Mar. 8, 1921 |
| 1,400,098 | Perrin | Dec. 13, 1921 |
| 1,433,676 | Cover | Oct. 31, 1922 |
| 1,819,738 | Daniels | Aug. 18, 1931 |
| 2,023,523 | Grimball | Dec. 10, 1935 |

FOREIGN PATENTS

| Number | Country | Date |
|---|---|---|
| 175,913 | Germany | Oct. 17, 1906 |